US012805611B2

(12) United States Patent
Einhorn

(10) Patent No.: US 12,805,611 B2
(45) Date of Patent: Nov. 24, 2026

(54) QUICK-RELEASE SYSTEM FOR A WATCH STRAP

(71) Applicant: Glashütter Uhrenbetrieb GmbH, Glashiitte/Sachsen (DE)

(72) Inventor: Sebastian Einhorn, Dresden (DE)

(73) Assignee: Glashütter Uhrenbetrieb GmbH, Glashiitte/Sachsen (DE)

( * ) Notice: Subject to any disclaimer, the term of this patent is extended or adjusted under 35 U.S.C. 154(b) by 253 days.

(21) Appl. No.: 18/782,273

(22) Filed: Jul. 24, 2024

(65) Prior Publication Data

US 2025/0098828 A1 Mar. 27, 2025

(30) Foreign Application Priority Data

Sep. 21, 2023 (EP) .................................... 23198778

(51) Int. Cl.
*A44C 5/14* (2006.01)
*G04B 37/14* (2006.01)

(52) U.S. Cl.
CPC .......... *A44C 5/147* (2013.01); *G04B 37/1486* (2013.01)

(58) Field of Classification Search
CPC ...... A44C 5/147; A44C 5/14; G04B 37/1486; G04B 37/16
See application file for complete search history.

(56) References Cited

U.S. PATENT DOCUMENTS 9,004,750 B2 * 4/2015 Tschumi ............ G04B 37/1486 368/282
9,010,593 B2 4/2015 Tschumi
12,501,972 B2 * 12/2025 Christian ................. A44C 5/14
2006/0280038 A1 12/2006 Hiranuma et al.
2022/0202147 A1 6/2022 Einhorn
2023/0141715 A1 * 5/2023 Christian ................. A44C 5/14 368/282

FOREIGN PATENT DOCUMENTS

JP 2022-104871 A 7/2022
JP 2023-084075 A 6/2023

OTHER PUBLICATIONS

European Search Report for EP 23 19 8778 dated Feb. 5, 2024.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A device for securing a watch strap on a watch case (1). The watch case (1) including a pin (3), a longitudinal slot (2) delimited by two main support surfaces (21, 22) parallel to a main plane (PP) and the connecting piece (10) includes at least one lateral face (56), which includes for its fixture to the case (1) at least one guiding groove (4) arranged to cooperate in a complementary manner with the pin (3), and the end link (10) includes at least one lock (5). The lock includes a slide catch (51) arranged to cooperate with the slot (2) in a locking position, towards which the slide catch (51) is moved by elastic return means (62) belonging to the lock, and including unlocking means arranged to be operated directly by a user to move the slide catch (51) away from the slot (2) of the case (1).

10 Claims, 5 Drawing Sheets

QUICK-RELEASE SYSTEM FOR A WATCH STRAP

CROSS REFERENCE TO RELATED APPLICATION

This application claims priority to European Patent Application No. 23198778.5 filed Sep. 21, 2023, the entire contents of which are incorporated herein by reference.

FIELD OF THE INVENTION

The invention relates to a to a quick-release system for a watch strap on a watchcase, in particular a metallic watch strap, or leather or rubber for example.

BACKGROUND OF THE INVENTION

There are known devices for the securement of a watch strap on a watchcase, for example from EP2229836 which discloses a quick-release system using a spring bar in combination with a rotatable lever, in which the connecting element is pushed onto the spring bar from above. However, the use of a spring bar severely limits the implementation of a locking system. It is also known from EP1128237A1 and EP3266333A1 quick-change systems that have a milling on the underside of the lugs, into which an interchangeable connecting piece is pushed. The locking mechanism is implemented in the first solution by means of a pivotable lever, in the second variant with a pusher that moves a slide when pressed. However, such devices have some disadvantages in terms of handling and functional safety.

SUMMARY OF THE INVENTION

It is an object of the invention to overcome these drawbacks in proposing a device for connecting a strap quickly and easily to an end link and which offers a high level of security.

Hence, the invention relates to a device for securing a watch strap on a watch case comprising an end link of a wristband for a watch for securing the watch strap on the watch case, said watch case comprising at least one pin, wherein said watchcase comprises a longitudinal slot delimited by two main support surfaces parallel to a main plane and said end link comprises at least one lateral face, which itself comprises for its fixture to said case (1) at least one guiding groove arranged to cooperate in a complementary manner with said pin, and said end link comprises at least one lock, wherein said lock comprises a slide catch arranged to cooperate with said slot in a locking position, towards which said slide catch is moved by elastic return means belonging to said lock, and comprising unlocking means arranged to be operated directly by a user to move said slide catch away from said slot of said case, said guiding groove is a curved guiding groove so that the slide catch is firmly maintain against one of the two main surface of the longitudinal slot in locking position. According to the invention, the end link comprises locking means arranged to cooperate with the end link and a bar to lock the bar on the end link when the end link is attached on the watch case.

According to other features of the invention:

- the end link comprises a through bore in which the bar goes through, the locking means partially resting in the through bore;
- the locking means comprises a locking pin arranged to cooperate with a groove formed on the bar;

- the end link comprises a hole leading into the through bore, the hole being arranged to receive the locking pin;
- the locking pin can move along its axis, the movement of the locking pin being limited by a step of the bore cooperating with a shoulder of the locking pin, and which forms an end stop the locking pin;
- the end link comprises a cover plate fixed to it to maintain the locking pin, the cover plate comprising a first opening for the slide catch and a second opening for the locking pin;
- locking means comprises elastic return means, which are seated on the locking pin and whose ends rest respectively on the second opening of the cover plate, and against the shoulder of the locking pin;
- the hole has a first section whose dimensions are similar to those of the shoulder, and a second section whose dimensions are similar to those of the locking pin;
- the slide catch comprises a head cooperating with said slot, said head comprising a slope arranged to cooperate with one of the two main support surface.

BRIEF DESCRIPTION OF THE DRAWING

Other features and advantages of the present invention will appear more clearly upon reading the following detailed description, made with reference to the annexed drawings, given by way of non-limiting and in with.

DETAILED DESCRIPTION OF THE PREFERRED EMBODIMENT

Figure 1:
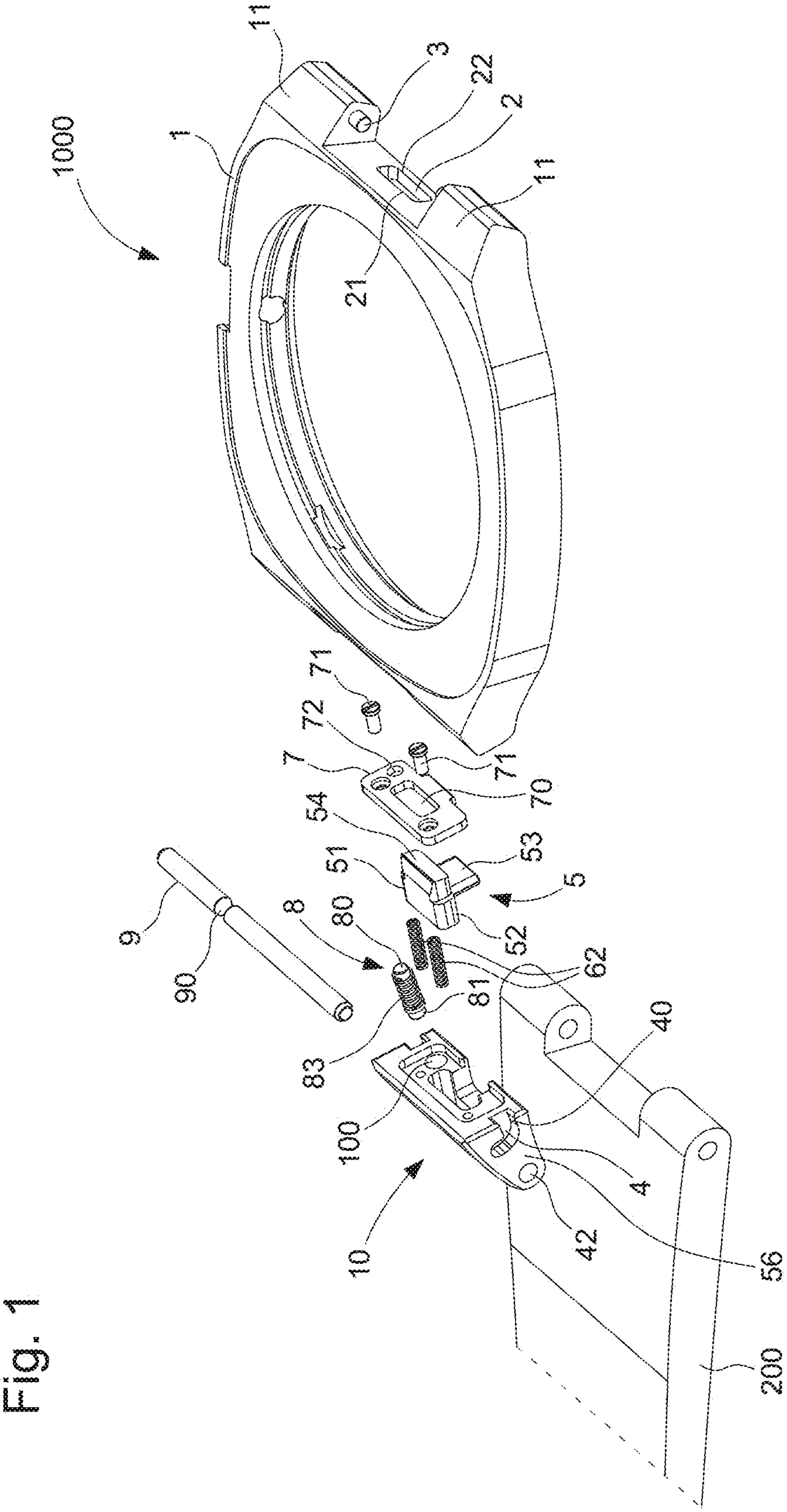
FIG. 1 is a perspective exploded view from the top of a watch equipped with a device according to the invention.

The invention proposes to give the user the possibility of easily and securely changing the watch strap fitted to his/her watch without changing the end link or the quick release system between the watch and the strap.

It must be possible to change the wristband with a simple cylindrical tool such as a pin or a pencil, and without delicate handling while allowing a fast change between a leather wristband and a linked metal wristband, for example, or also allowing the wristband to be matched to items of clothing and/or jewellery worn by the user or to the complexion of the user, in accordance with the circumstances of use of the watch. The interchangeable wristband also enables wristbands of different length to be exchanged instantaneously, which allows retailers and dealers to immediately supply their customers with perfectly suited watches.

The invention is described more precisely here for the preferred case of watch band end links, which can be produced in series at a manageable cost and need only be joined to a wristband body, but it is also possible to choose a configuration of wristband in a single piece without a separate end piece, and including the functionalities of interchangeability and locking necessary for good function, but naturally at a higher cost price. The person skilled in the art will know how to adapt the arrangement described below for an end link to an entire wristband without the least problem.

The invention thus preferably relates to a watch band end link 10 for a wristband 200.

To receive such a link 10, this case 1 comprises two pins 3 or studs or similar belonging to the case 1, the two pins 3 being inserted into corresponding bores, either by gluing, pressing or soldering, and the bores being drilled perpendicular to the 6H-12H axis of the case from the inner faces the horn 11. These pins 3 are arranged to cooperate in a complementary manner with a curved guiding groove 40 machined in the lateral face 56 of the end link 10.

Each pin 3 is preferably carried by a reinforced zone of the case 1, in particular a horn. The connection between each pin 3 and each horn must have sufficiently broad dimensions to absorb stresses, in particular traction, torsion and accelerations experienced by the wristband and the case 1. The simple insertion of the end link 10 onto these pins 3, which are preferably symmetrical in relation to a plane of symmetry, ensures the interchangeability of the wristbands 9 in relation to the case 1. Similarly, the removal must be designed so that no hindrance is encountered.

To assure the safety function and the insertion of a locking mechanism of the end link 10 when the pins 3 are in an abutment position in the guiding grooves 40, the mechanism comprises a system for locking and unlocking.

For this, the end link 10 has a particular machined structure, as can be seen from the particular non-restrictive variant illustrated by the figures.

This particular machined structure preferably comprises at least a longitudinal slot 2, which is delimited by two main support surfaces 21, 22 parallel to a main plane PP, the two main support surfaces 21, 22 comprising an upper support surface 21 and a lower support surface 22, the upper one being longer than the lower one. Of course, surfaces 21 and 22 may have the same length without preventing the slot 2 from maintaining the slide catch.

Such a slot 2 having two parallel faces is very easy to make by turning or by milling. It is preferably located between the horns 11 of the case 1, as can be seen in FIG. 1.

Advantageously, the vertical face between the lugs is angled so that the connecting piece 10 follows the natural shape of the wrist. The slot 2 is milled parallel to the PP surface in order to be as easy to manufacture as possible.

To assure the locking function, the link 10 comprises at least one lock 50. This lock 50 comprises a slide catch 51, which is arranged to cooperate in a complementary manner and with minimal play with the slot 2 in a locking position, towards which the slide catch 51 is moved by elastic restoring means 62 belonging to the end link 10. Moreover, the end link 10 comprises unlocking means arranged to be operated directly by a finger of a user to move said slide catch 51 away from said slot 2 of said case 1. Therefore, no tool is necessary to either perform the unlocking or the locking or to perform the insertion or the removal of the link 10 into or from the case 1.

As can be seen in FIG. 1, the guiding grooves are curved guiding groove so that the slide catch 51 is firmly maintain against one of the two main surface 21, 22 of the longitudinal slot 2 in locking position. The curved or angled shape of the guide groove also ensures that the end link always rests against the watch case to avoid gaps between the parts.

As illustrated, the slide catch 51 comprises a head 54 cooperating with said slot 2, the head 54 comprising a slope arranged to cooperate in abutment with one of the main support surfaces 21, 22 of the slot 2 of the case 1, in which the head 54 preferably runs with minimal play.

The end link 10 comprises a guiding chamber 6 to receive the said slide catch 51 and for receiving elastic return means 62 (not visible on figures).

In the figures the slide catch 51 is guided with two grooves 60 belonging to the end link and cooperating with two guiding surfaces 52 of the slide catch 51. The slide catch 51 is installed from the side facing the case by pushing it into the guiding chamber 6 at the front.

The end link 10 also has a back guide chamber which assures reception of the elastic returning means illustrated in a non-restrictive manner by spiral springs.

For its operation, the lock 50 preferably comprises a pushbutton 53, which is arranged to be operated by a finger of a user to control an unlocking of the locking means by retraction of the slide catch 51 by an application of pressure to this pushbutton 53.

In an advantageous configuration, the guiding chamber 6 comprises an opening 61, which is arranged to receive the pushbutton 53, said pushbutton going through and sliding in the said opening 61.

According to the invention, the end link comprises locking means 8 arranged to cooperate with the end link 10 and a bar 9 to lock the bar on the end link 10 when the end link is attached on the watch case 1.

The end link 10 comprises a through bore 42 arranged to receive a strap bar 9, the trough bore 42 extending across the width of the end link 10 along an axis X. Furthermore, the end link 10 comprises a hole 100 perpendicular to the bore 42 which leads into the through bore 42, extending along an axis Y. Said hole 100 is arranged to receive a locking pin 8 to lock the strap bar 9 in the connecting piece 10 when the connecting piece 10 is mounted on the watch case 1.

Figure 5A:
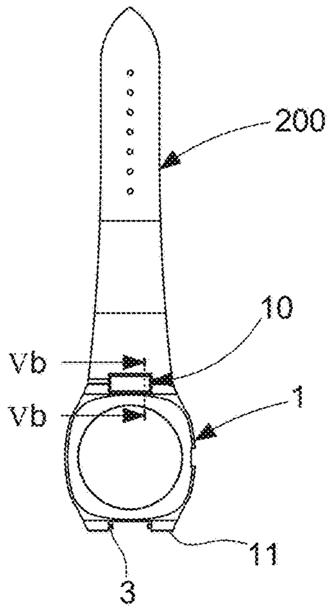
FIGS. 5*a* to 5*c* are respectively a view from top, and cross views of a watch equipped with a device according to the invention in locked position.
Figure 5B:
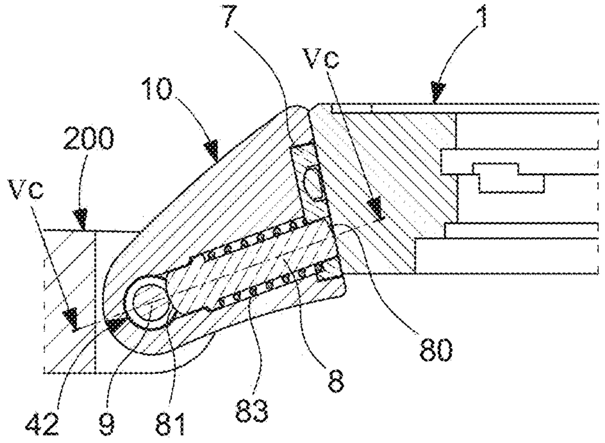
Figure 5C:
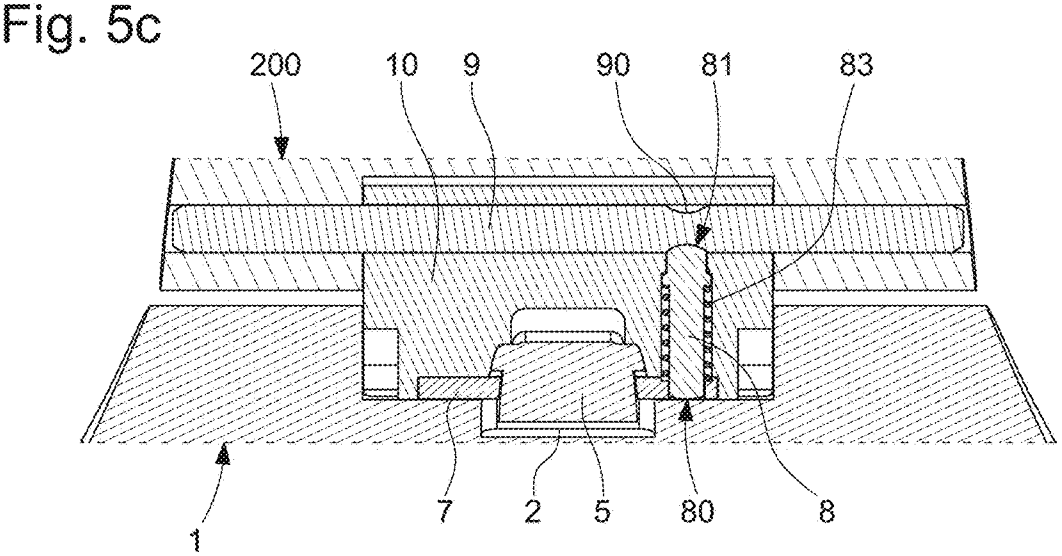

As can be seen on FIGS. 5*b* and 5*c*, the locking means 8 partially rests in the through bore 42, the locking means comprising a locking pin 8 arranged to cooperate with a groove 90 formed on the bar 9 in order to lock the bar in the end link 10.

Figure 2A:
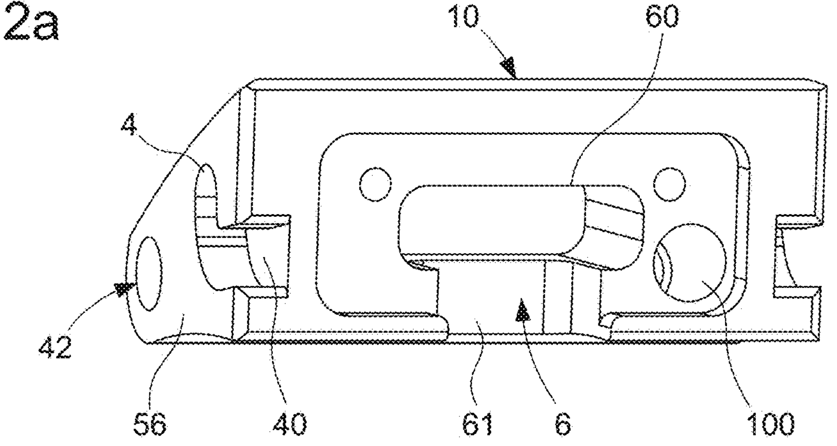
FIG. 2*a* is a perspective view from the bottom of a watch equipped with a device according to the invention.
Figure 2B:
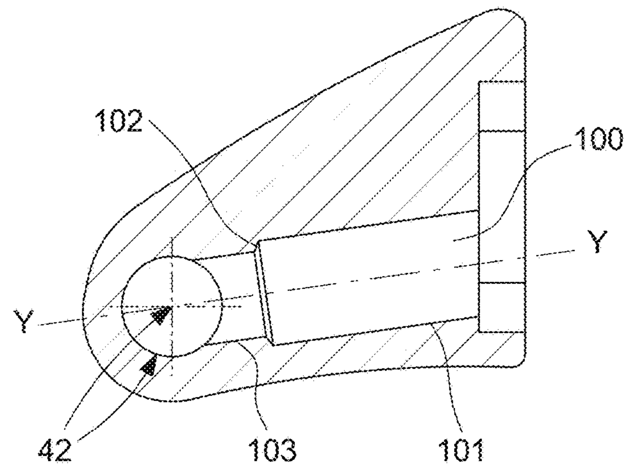
FIGS. 2*b* and 2*c* are cross-section views of a device according to the invention.
Figure 2C:
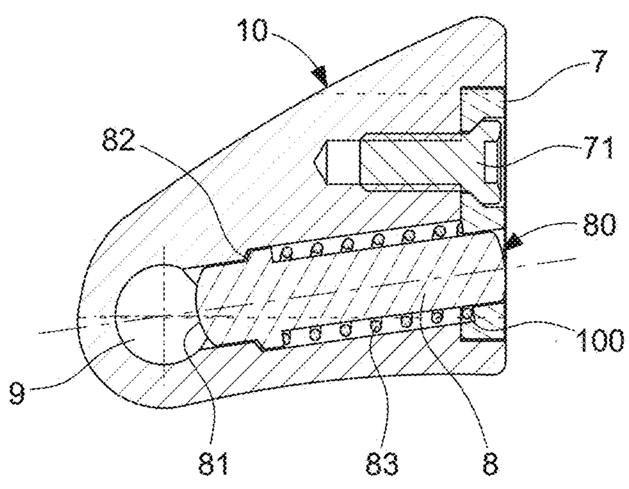
Figure 3:
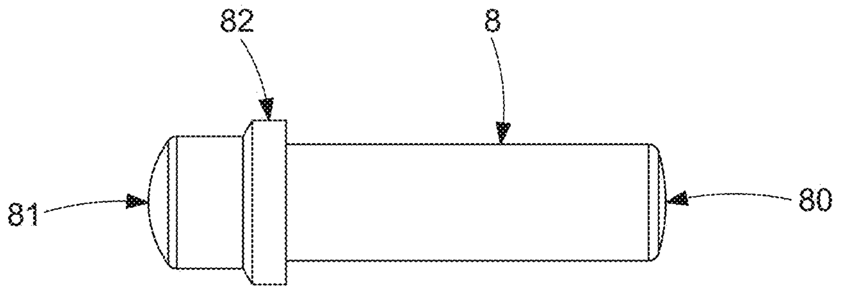
FIG. 3 is a perspective view of a locking pin of the device according to the invention.
Figure 4:
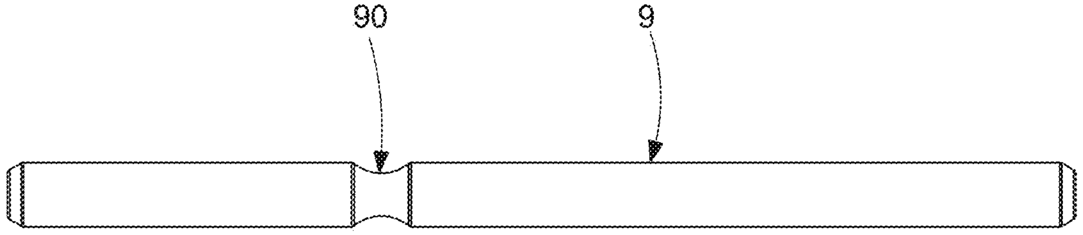
FIG. 4 is an perspective view of a bar according to the invention.

As illustrated on FIGS. 1 and 2*c*, the end link 10 comprises a cover plate 7 which has a through bore 2*a* for the locking pin 8, the cover plate 7 being fixed to the end link 10. The cove plate 7 can be fixed, for example, in the normal way by using screws 71. Depending on the design, other variants are possible, such as a sleeve that is fixed into the bore 100. The cover plate 7 also comprises a first opening 70 for the slide catch 51 and a second opening 72 for the locking pin 3.

The locking pin 8 can move along its axis in the directions of Y-axis. The movement of the locking pin 8 is limited in the direction Y by a step 102 of the bore 100 cooperating with a shoulder 82 of the locking pin 8, and which forms an end stop the locking pin 8.

The hole 100 has a first section 101 whose dimensions are similar to those of the shoulder 82 of the locking pin 8, and a second section 103 whose dimensions are similar to those of the locking pin 8, the step 102 forming the separation between the first and second sections 101 and 103.

According to the invention, the locking pin 8 comprises elastic return means 83 in order to keep it in its resting position. The elastic returns means comprise a coil spring 83 which is seated on the locking pin 8 and whose ends rest respectively on the second opening of the cover plate 7, and against the shoulder 82 of the locking pin 3. As a result, the locking pin 8 is slightly protruding from the plate 7 when the end link 10 is not mounted on the watch case and when the strap bar 9 slides out of the trough hole 42. Thus, the strap 200 can only be removed when the end link is not mounted on the watch case.

Advantageously, the locking pin 8 comprises a first and second half-spherical face 80, 81 on each end. Thus, when assembled, the second half-spherical end 81 is easily engaged in the groove 90 of the strap bar 9, and prevents the strap bar 9 from moving along the trough hole 42. The first half-spherical end 80 is arranged to rest against the watch case 1 when the end link 10 is mounted on it.

As illustrated on FIGS. 5*a* to 5*c*, when the end link 10 is attached to the case 1, the first half-spherical end 80 of the locking pin 8 is in contact with surface the case 1. This ensures that the locking pin 8 cannot move in the Y direction and the first half-spherical end 81 is always securely engaged into groove 90 of the strap bar 9. As a result, the strap bar 9 cannot move in its axial direction, even when being exerted to a large force, which ensure a secure connection between end link 1 and the strap 200.

Figure 6A:
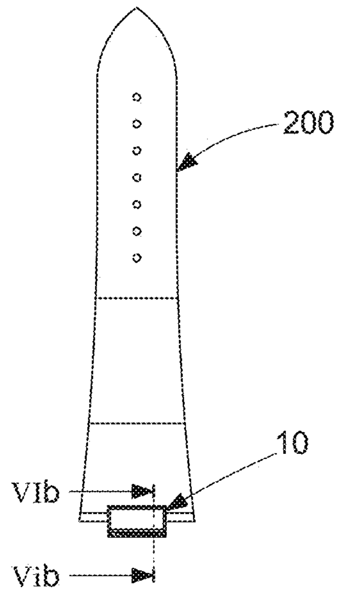
FIGS. 6*a* to 6*c* are respectively a view from top, and cross views of a watch equipped with a device according to the invention in unlocked position.
Figure 6B:
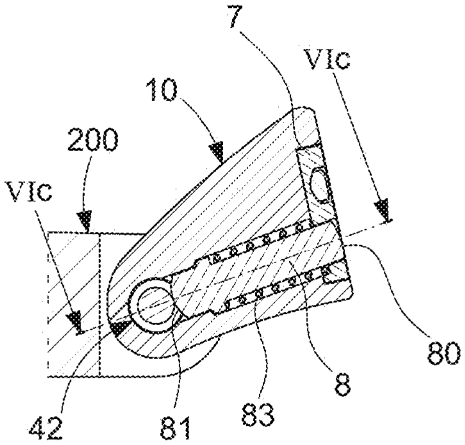
Figure 6C:
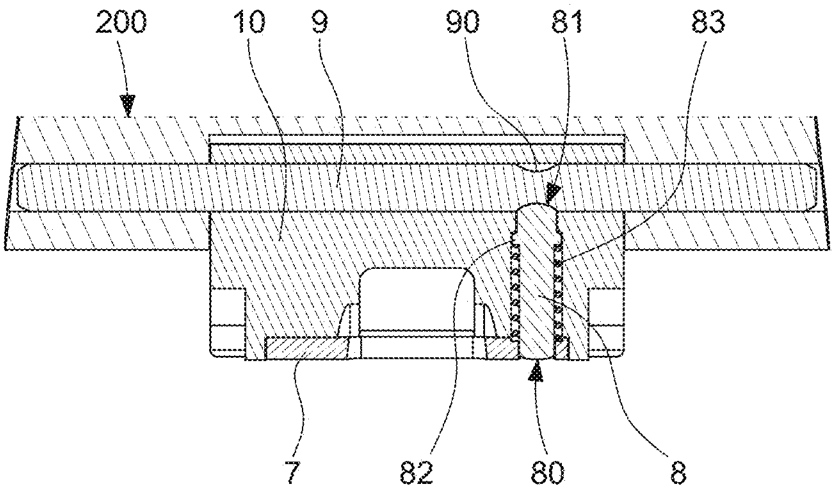

When wearer wishes to change the strap 200, he first needs to unlock the end link 10 from the watch case 1 thanks to the slide catch 51. Thus, when the end link 10 is unattached from the watch case, the first end 80 of the locking pin 8 is no longer being blocked from the case as illustrated on FIGS. 6*b* and 6*c*.

Then, when a sufficiently force is exerted to the strap bar in its axial direction, which exceeds the detent force of the coil spring 83, the second end 81 of the locking pin 8 slides out of the groove 90 of the strap bar 9 and thus releases it. The strap bar 9 can now be removed from the end link 10 and the strap 200 can be changed for another strap.

To remount a strap 200 to the end link 10, the end link 10 is positioned in the recess of the strap so that the axis of the hole in the strap 200 and the trough hole 42 in end link 10 align. The strap pin 9 is then inserted through the hole in the strap into the trough hole 42 in the end link. The strap bar 9 can then be inserted until the second end 81 of the locking pin 8 engages into the groove 90 of the strap bar 9. When the end link 10 is attached and locked to the case again, the strap bar 9 is secured again against axial movement, as described above, and thus a secure connection is realized.

The invention also relates to a watch 1000 comprising a watch case 1, which is configured to receive at least one said end link 10. More particularly, the watch 1000 comprises at least one removable strap 200, which at one of its ends has such a removable end link 10 equipped with locking means to offer a secure connection of the strap onto the end link 10.

The invention claimed is:

1. A device for securing a watch strap on a watch case (1) comprising an end link (10) of a wristband for a watch for securing the watch strap on the watch case (1), said watch case (1) comprising at least one pin (3), wherein said watchcase (1) comprises a longitudinal slot (2) delimited by two main support surfaces (21, 22) parallel to a main plane (PP) and said end link (10) comprises at least one lateral face (56), which itself comprises for its fixture to said case (1) at least one guiding groove (4) arranged to cooperate in a complementary manner with said pin (3), and said end link (10) comprises at least one lock (5), wherein said lock (5) comprises a slide catch (51) arranged to cooperate with said slot (2) in a locking position, towards which said slide catch (51) is moved by elastic return means (62) belonging to said lock (5), and comprising unlocking means arranged to be operated directly by a user to move said slide catch (51) away from said slot (2) of said case (1), said guiding groove is a curved guiding groove so that the slide catch (51) is firmly maintained against one of the two main surface (21, 22) of the longitudinal slot (2) in locking position, wherein the end link comprises locking means (8) arranged to cooperate with the end link (10) and a bar (9) to lock said bar on the end link (10) when the end link is attached on the watch case, wherein the locking means (8) comprises a locking pin (8) arranged to cooperate with a groove (90) formed on the bar (9), and wherein the end link (10) comprises a hole (100) leading into the through bore (42), the hole (100) being arranged to receive the locking pin (8).

2. The device for securing a watch strap according to claim 1, wherein the end link (10) comprises a through bore (42) in which the bar (9) goes through, the locking means (8) partially resting in the through bore (42).

3. The device according to claim 1, wherein the locking pin (3) can move along its axis, the movement of the locking pin (3) being limited by a step (102) of the bore (100) cooperating with a shoulder (82) of the locking pin (3), and which forms an end stop the locking pin (3).

4. The device according to claim 1, wherein the end link (10) comprises a cover plate (7) fixed to it to maintain the locking pin (3), the cover plate (7) comprising a first opening (70) for the slide catch (51) and a second opening (72) for the locking pin (3).

5. The device according to claim 4, wherein locking means (8) comprises elastic return means (83), which are seated on the locking pin (3) and whose ends rest respectively on the second opening of the cover plate (7), and against the shoulder (82) of the locking pin (8).

6. The device according to claim 1, wherein the hole (100) has a first section (101) whose dimensions are configured to receive the shoulder (82), and a second section (102) whose dimensions are configured to receive the locking pin (8).

7. The device according to claim 1, wherein the slide catch (51) comprises a head cooperating with said slot (2), said head comprising a slope (54) arranged to cooperate with one of the two main support surface (21, 22).

8. A wristband (9) comprising at least one end link (10) of the device according to claim 1.

9. A watch (1000) comprising a watch case (1), which is configured to receive at least one device for securing a watch strap on the watch case (1) according to claim 1.

10. A device for securing a watch strap on a watch case (1) comprising an end link (10) of a wristband for a watch for securing the watch strap on the watch case (1), said watch case (1) comprising at least one pin (3), wherein said watchcase (1) comprises a longitudinal slot (2) delimited by two main support surfaces (21, 22) parallel to a main plane (PP) and said end link (10) comprises at least one lateral face (56), which itself comprises for its fixture to said case (1) at least one guiding groove (4) arranged to cooperate in a complementary manner with said pin (3), and said end link (10) comprises at least one lock (5), wherein said lock (5) comprises a slide catch (51) arranged to cooperate with said slot (2) in a locking position, towards which said slide catch (51) is moved by elastic return means (62) belonging to said lock (5), and comprising unlocking means arranged to be operated directly by a user to move said slide catch (51) away from said slot (2) of said case (1), said guiding groove is a curved guiding groove so that the slide catch (51) is firmly maintained against one of the two main surface (21, 22) of the longitudinal slot (2) in locking position, wherein the end link comprises locking means (8) arranged to cooperate with the end link (10) and a bar (9) to lock said bar on the end link (10) when the end link is attached on the watch case, and wherein the locking pin (3) can move along its axis, the movement of the locking pin (3) being limited by a step (102) of the bore (100) cooperating with a shoulder (82) of the locking pin (3), and which forms an end stop the locking pin (3).

* * * * *